Jan. 23, 1968 — W. A. SEABURY III — 3,365,123
ADJUSTABLE CLAMP
Filed Feb. 2, 1966

INVENTOR.
WILLIAM A. SEABURY III
BY
Brumbaugh, Free, Graves & Donohue
his ATTORNEYS

United States Patent Office 3,365,123
Patented Jan. 23, 1968

3,365,123
ADJUSTABLE CLAMP
William A. Seabury III, Ulster Park, N.Y., assignor to Rotron Manufacturing Company, Inc., Woodstock, N.Y., a corporation of New York
Filed Feb. 2, 1966, Ser. No. 524,540
7 Claims. (Cl. 230—117)

ABSTRACT OF THE DISCLOSURE

A clamping arrangement for securing a tubular member to a support member in generally coaxial relation including a series of radially extending inclined surfaces supported forwardly of the support member, each co-operating with a clamping block of which one end engages an associated inclined surface and an opposite end is adapted to engage the interior surface of the tubular member. The support member includes a flange extending generally normal to the axis of the tubular member and having elongated slots through which independent screw fasteners engaging the flange and the blocks are inserted. Tightening or loosening of the screws effects a corresponding radial movement of the blocks along the inclined surfaces to bring their opposite ends into engagement with the interior surface of the tubular member with sufficient force to retain both members in fixed relationship.

---

This invention relates to adjustable clamps; more specifically, it relates to an improved adjustable clamp for joining two relatively rotatable parts in such a way that they can be firmly fastened together and readily separated or rotated when desired.

In many instances, two parts must be joined such that they are rigidly secured but also so that they may be rotatably positioned from time to time. It is often the case that one of the parts is irregularly formed so that a symmetrical clamping device (e.g., a ring clamp) cannot be used effectively. If it is required that the parts be rotatably positionable, semi-permanent fasteners such as bolts are unsatisfactory. For example, in centrifugal blower assemblies, a motor housing is usually mounted directly to the blower, or impeller, casing. Often, this housing is permanently secured to the casing so that the angular position of the motor casing relative to the housing remains fixed. Blowers of this type are customarily mounted by securing the motor housing to a rigid support. When this is done, the direction of the air blast delivered by the blower is also fixed and cannot be altered except by changing the mounting position or by coupling the output of the blower to a special directional or flexible conduit. By making the blower casing adjustably rotatably with respect to the motor housing, the direction or air blast can be altered without necessitating remounting of the motor housing.

Many products which are eventually mated to other parts are fabricated from synthetic materials, such as, fiberglass or polyester resin. One disadvantage of these materials is their tendency to deform slightly after the molding process. Due to this fact, precise mating to other parts by conventional fastening means is precluded or made difficult, particularly if the parts must have rotational freedom when the fastener is loosened.

It is therefore an object of this invention to provide a clamping device for securing together two parts for adjustable rotational freedom, which overcomes the aforementioned difficulties.

Another object of the invention is to provide adjustable fastening means for parts whose meeting edges or surfaces may be irregularly formed.

A further object of this invention is to provide a clamping device for securing a motor housing to casings of centrifugal blowers and the like so that the casing is rotatable with respect to the housing and readily releasable therefrom.

Yet a further object of the invention is to provide a clamp for joining two abutting generally cylindrical parts without extending the overall radial dimension of either.

These and other objects of the invention are attained by providing one of the parts to be joined with a number of radially extending surfaces inclined relative to a shoulder on the other part. Clamping blocks each having a surface at one end adapted to slidably engage a respective inclined surface on the one part, are adjustably situated to frictionally engage the shoulder of the other part. A tightening device, such as a screw, engages each clamping block so that when the screw is tightened, the block moves toward the screw head and along the inclined surface, engaging the shoulder of the mating part.

For a better understanding of the invention, reference may be made to the following detailed description of an exemplary embodiment, and to the drawings, in which.

For the purpose of illustration, the adjustable clamp according to the invention is described in connection with a centrifugal blower, although it is understood that the clamp is applicable to the joining or mounting of many other parts or apparatus, as for example, flanged conduits and the like.

Figure 1A:
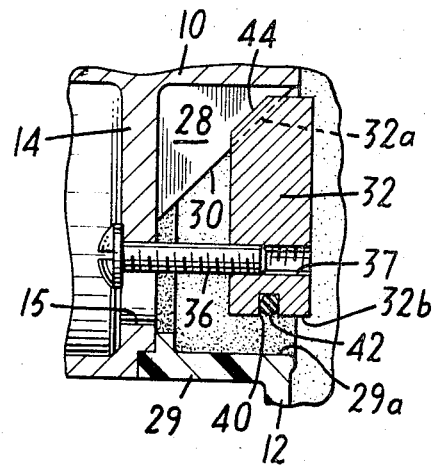
FIGURE 1A is an enlarged detail in cross-section of the adjustable clamp shown in FIGURE 1.
Figure 1:
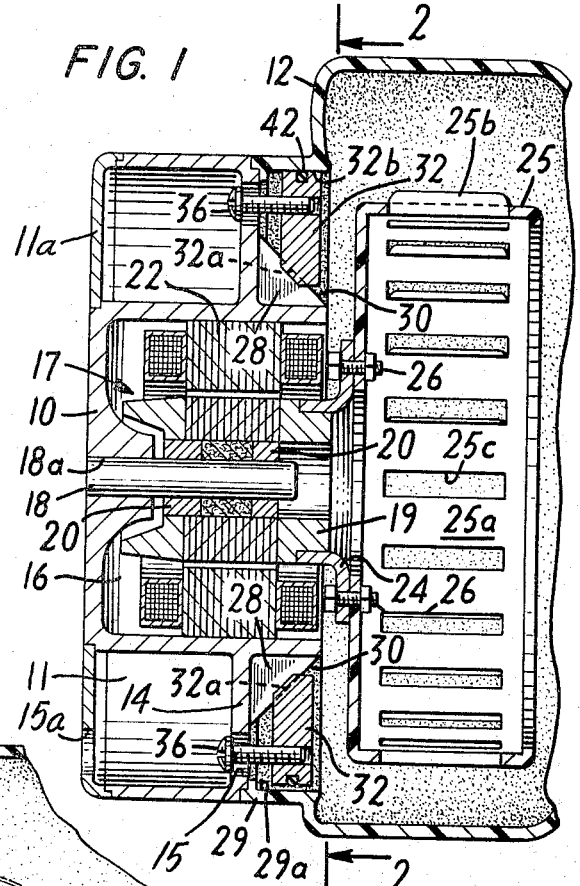
FIGURE 1 is a cross-sectional view of a motor housing mounted to a centrifugal blower casing in accordance with the invention, taken along the line 1—1 in FIGURE 2.
Figure 2:
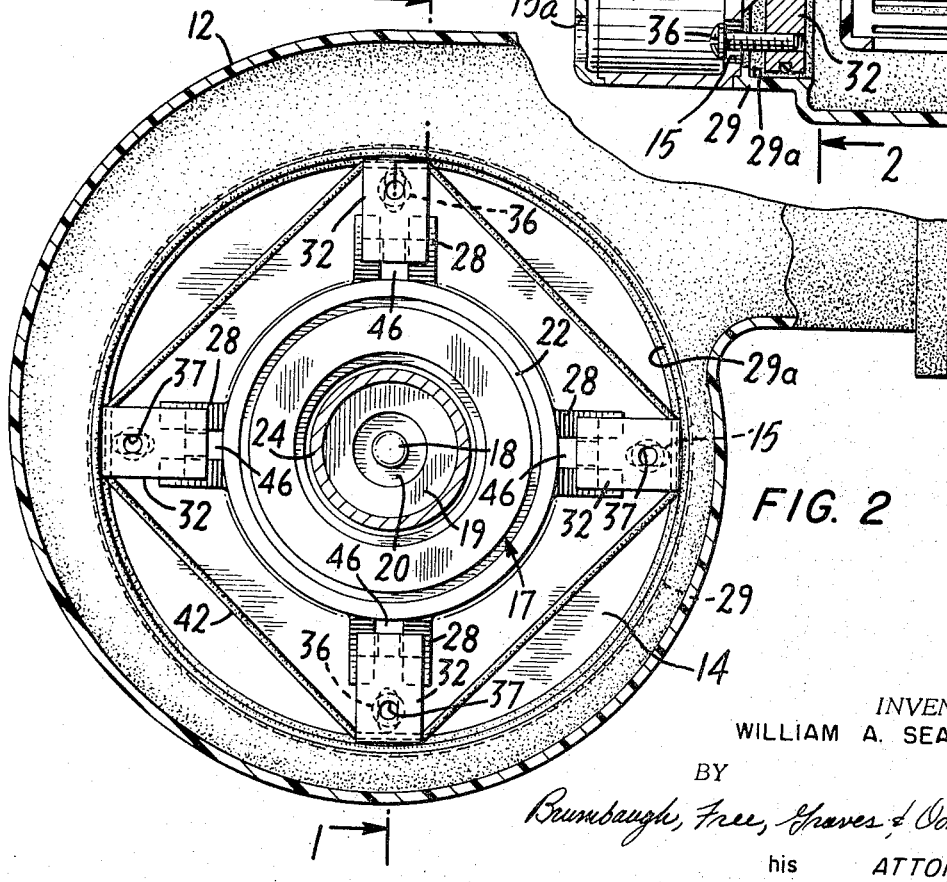
FIGURE 2 is a cross-sectional view of the blower assembly shown in FIGURE 1, taken generally along the line 2—2 of FIGURE 1.

FIGURES 1 and 2 illustrate a centrifugal blower including a motor housing 10 secured to a representative impeller casing 12 in accordance with the invention. As shown, the outer peripheries of the motor housing 10 and the casing 12 at the point of contact meet to form a smooth cylinder. The housing 10 includes a circumferential, radially extending flange 14 having a plurality of spaced elongated slots 15 near its perimeter. Formed in the housing 10 are a cylindrical chamber 16 for receiving an electric motor 17 and an annular cavity 11 which may be used to house electrical components, such as starting capacitors, switches, etc. The cavity 11 may be closed by a suitable ring 11a snap fitted into place.

The fixed rotor shaft 18 is mounted cantilever fashion in the bore 18a and supports the rotor 19 on two axially spaced bearings 20. The motor stator 22 extends circumferentially around the inside of the chamber 16 and is excited through electrical connections (not shown) made to the motor from the cavity 11. At the inboard end of the stator 19 is affixed a flared hub 24 which supports an impeller 25 for rotation with the rotor 19. The radially extending impeller blades 25b are adjacent the impeller slots 25c. As shown, the impeller is mounted to the flared hub 24 by bolts 26 extending through each of these parts. When electrical power is applied to the motor 17, the rotating magnetic field induces clockwise motion (FIGURE 2) of the rotor 19 and air is drawn into the casing 12 and the central portion 25a of the impeller through an intake (not shown) at the side of the casing 12.

Formed integrally with or fastened to the housing 10 against the flange 14 are a plurality of radially extending webs 28 providing surfaces 30 which are inclined relative to the flange 14. Associated with each of these webs 28 is a clamping block 32 having a truncated end providing a surface 32a adapted for sliding engagement with the inclined surface 30. The other end 32b of the clamping block is adapted for frictional engagement with the interior surface 29a of a tubular or annular extension or shoulder 29 on the impeller casing as illustrated. For alignment purposes, the extension 29 may be provided with an inwardly extending flange to facilitate engagement with a suitable recess along the outer peripheral edge of the motor housing 10. Tightening screws 36 extend through the slots 15 to engage threaded holes 37 provided in the clamping blocks 32. Access to the screws 36 may be provided through apertures 15a in the ring 11a.

The blocks 32 can be made of any suitable material, such as nylon, and may be provided at the end 32b with a special gripping surface having a high coefficient of friction, if desired. In the usual case, however, this is not necessary, since the pressure exerted by the block 32 against the surface 29a is sufficient to securely hold the casing 12 in place. As shown, the block end 32b is squarely formed, but this end can be shaped to conform to the surface against which it bears. It is obvious from FIGURE 2, for example, that the end 32b can be curvilinear to abut at all points thereon the extension surface 29a.

When the housing 10 and the casing 12 are in the desired position as shown in FIGURES 1 and 2, clamping is effected by tightening the screws 36, thus drawing the blocks 32 toward the head of the screw along the inclined surfaces 30, as is best apparent from FIGURE 1A which illustrates the block 32 in the retracted, or loosened, position. As the blocks 32 are thus adjusted, they are urged outwardly by the inclined surface 30 and into engagement under substantial force with surface 29a. It will be appreciated that effective clamping is not impaired by irregularities in the cylindrical form of the shoulder 29, since a considerable degree of radially outward and inward motion can be achieved, limited only by the length of the inclined surfaces 30. By virtue of this fact, manufacturing tolerances can be relaxed with resultant economic advantages, since the requirement for a precise mating of parts is, in many instances, eliminated.

In accordance with the invention, a slight loosening of the screws 36 enables the casing 12 to be rotated with respect to the motor housing 10. Further loosening allows the inwardly extending flange on the surface 29a to clear the ends 32b of the blocks and permit separation of the housing 10 and casing 12. The blocks 32 are withdrawn inwardly from the surface 29a when the screws are loosened, as depicted in FIGURE 1A, by means of an elastic band 42 (see FIGURE 2) engaging slots 40 in the surfaces 32b of the blocks, which yieldably urges the blocks 32 inwardly along the inclined surfaces 30. Alternatively, a spring or other similar device bearing against the surface 29a may be inserted into the groove 40 in place of the elastic band 42. For the purpose of maintaining the blocks 32 in proper alignment and for guiding their motion along the inclined surfaces 32, there is a projecting tongue 44 on each block 32, which is received in a channel 46 formed in the inclined surface of each of the webs 28.

The radial slots 15 in the flange 14 indicate when the screws 36 have been loosened sufficiently to permit separation of the two housings. As a screw is loosened, its associated block as well as the screw are moved inwardly until the screw reaches the inner end of the slot (see FIGURE 1A). This indicates that it is sufficiently loosened and reduces the possibilities of completely disengaging the screw from the block.

It is significant to note that the invention is not limited to joining only two pieces in abutting relation, but is also applicable where the pieces are in separated alignment. For example, clamping is equally effective if the impeller casing 12 and the motor housing 10 in FIGURE 1 were axially separated, since it is primarily the outwardly directed forces applied to the surface 29a by the blocks 32 and not any reaction forces existing between the flange 14 and the shoulder 29 that secure the parts against relative movement, although the latter forces may be present.

The invention thus provides a clamping device which has universal application for adjustably joining together parts of the general type described, and readily adapts to pieces of irregular shapes. The invention is specifically applicable to mounting a motor housing to an impeller or fan casing to provide an improved centrifugal blower in which the air blast can be adjustably directed. Moreover, a clamping device in accordance with the invention preserves the appearance of the joined parts, since it can be used internally of the parts.

Although the invention has been described with reference to specific embodiments thereof, these are representative only, and many modifications and variations, both in form and detail, may be made within the skill of the art. Accordingly, all such variations and modifications are intended to be included within the scope and spirit of the appended claims.

I claim:

1. A clamping arrangement for securing a tubular member to a support member in generally coaxial relation, comprising a plurality of radially extending inclined surfaces supported forwardly of said support member, a plurality of independently controlled clamping blocks having opposed ends, one clamping block for each of said inclined surfaces, each block having one end engaging its associated inclined surface and an opposite end adapted to engage the interior surface of said tubular member, and separate means engaging said support member for moving said blocks independently along said inclined surfaces to bring the opposite ends thereof into engagement with the interior surface of said tubular member with sufficient force to retain said members in fixed relationship.

2. A clamping arrangement as set forth in claim 1, further comprising means for yieldably urging the one ends of said blocks against said inclined surfaces.

3. A clamping arrangement in accordance with claim 1, in which the inclined surfaces have a channel extending in the direction of motion of the block, and further comprising a projection on each block cooperating with the channel means for guiding the movement of said blocks along said inclined surfaces.

4. A clamping arrangement as defined in claim 1 wherein the one ends of said blocks in sliding engagement with the inclined surface are truncated and the support member includes an annular flange extending generally normal to the axis of a tubular member, and wherein said means are screw fasteners engaging and extending through the flange on the support member and the respective blocks.

5. In a blower of the type including a fan casing and a motor housing adapted for generally coaxial mounting thereto, the combination of a flange on the housing, an annular extension on the casing generally perpendicular to the flange, means providing a plurality of inclined surfaces relative to said extension, said surfaces being disposed around the motor housing interiorally of the casing, a plurality of clamping blocks having one end adapted for sliding engagement with the respective inclined surfaces and an opposite end for frictional engagement with the interior surface of said extension, and fastening means engaging said blocks and said housing for effecting adjustable movement of the blocks along said respective inclined surfaces to bring the opposite ends thereof into engagement with said interior surface with sufficient force to retain the casing and housing in fixed relationship.

6. A blower in accordance with claim 5, wherein each of said blocks has a groove at its extension engaging end, and further comprising resilient means received by said grooves for yieldably urging said blocks against the respective inclined surfaces.

7. A blower assembly comprising a fan casing having a tubular extension, a motor housing having a radially extending flange adapted to abut said extension approximately at right angles, said flange having radially elongated slots disposed therearound, means associated with said housing providing a plurality of radially extending surfaces inclined relative to said extension and flange, said surfaces disposed inwardly of the periphery of said flange and said extension, a plurality of clamping blocks each associated with one of said surfaces, said clamping blocks having one end slidably engaging said surfaces and an opposite end for frictionally engaging the interior surface of said extension, and fastening means adapted for insertion through said slots and engaging said blocks to effect slidable adjustment of the blocks along the inclined surfaces to bring the opposite ends thereof into engagement with said interior surface with sufficient force to retain the casing and housing in abutting relationship.

References Cited

UNITED STATES PATENTS

| | | | |
|---|---|---|---|
| 1,653,547 | 12/1927 | Cameron | 103—219 X |
| 1,980,985 | 11/1934 | Deming | 103—219 X |
| 2,043,492 | 6/1936 | Reynolds | 103—219 |
| 3,195,643 | 7/1965 | Harbison et al. | 103—219 X |

HENRY F. RADUAZO, *Primary Examiner.*

ROBERT M. WALKER, *Examiner.*